United States Patent
Clark et al.

(10) Patent No.: US 9,940,732 B2
(45) Date of Patent: *Apr. 10, 2018

(54) IMPLEMENTING REDUCED VIDEO STREAM BANDWIDTH REQUIREMENTS WHEN REMOTELY RENDERING COMPLEX COMPUTER GRAPHICS SCENE

(71) Applicant: International Business Machines Corporation, Armonk, NY (US)

(72) Inventors: Adam T. Clark, Mantorville, MN (US); John E. Petri, St Charles, MN (US); Kevin Wendzel, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/290,034

(22) Filed: May 29, 2014

(65) Prior Publication Data

US 2015/0229693 A1    Aug. 13, 2015

Related U.S. Application Data

(63) Continuation of application No. 14/177,436, filed on Feb. 11, 2014.

(51) Int. Cl.
*G06T 9/00* (2006.01)
*H04L 29/06* (2006.01)

(52) U.S. Cl.
CPC .............. *G06T 9/00* (2013.01); *H04L 65/602* (2013.01)

(58) Field of Classification Search
None
See application file for complete search history.

(56) References Cited

U.S. PATENT DOCUMENTS

| | | | |
|---|---|---|---|
| 5,751,289 A * | 5/1998 | Myers | 345/419 |
| 6,864,888 B1 | 3/2005 | Quinn et al. | |
| 7,173,635 B2 | 2/2007 | Amann et al. | |
| 7,281,213 B2 | 10/2007 | Callegari | |
| 2002/0154148 A1 * | 10/2002 | Inoue | G09G 5/14 345/660 |
| 2003/0030575 A1 * | 2/2003 | Frachtenberg | H03M 7/3088 341/51 |
| 2003/0033402 A1 * | 2/2003 | Battat et al. | 709/224 |
| 2003/0117528 A1 * | 6/2003 | Liang et al. | 348/578 |
| 2010/0034425 A1 * | 2/2010 | Lin | G06T 7/20 382/103 |
| 2011/0055320 A1 | 3/2011 | Gino et al. | |
| 2011/0081044 A1 | 4/2011 | Peeper et al. | |
| 2015/0134770 A1 * | 5/2015 | Heinz et al. | 709/217 |

* cited by examiner

*Primary Examiner* — Aaron M Richer
(74) *Attorney, Agent, or Firm* — Joan Pennington

(57) ABSTRACT

A method and apparatus are provided for implementing reduced video stream bandwidth requirements when remotely rendering a complex computer graphics scene. Complexity of a scene is reduced at a server, prior to rendering a video stream that comprises the scene and transmitting the video stream to a client. Reducing the complexity of a scene at the server includes adjusting predefined scene configuration parameters. The order and degree to which predefined scene configuration parameters are adjusted is based upon a required stream bandwidth reduction to be made.

9 Claims, 6 Drawing Sheets

400

HISTORY DATA 146

| PACKET ID 402 | ACTION 404 | RESULT 406 |
|---|---|---|
| PACKET 1 | ACTION = NONE FOR LEVEL 1, NONE FOR LEVEL 2, NONE FOR LEVEL 3 | PERFORMANCE DECREASE 5% |
| PACKET 2 | ACTION = NONE FOR LEVEL 1, NONE FOR LEVEL 2, NONE FOR LEVEL 3 | PERFORMANCE DECREASE 25% |
| PACKET 3 | ACTION = ANTI-ALIASING OF LEVEL 1, REMOVAL OF LEVEL 2, REMOVAL OF LEVEL 3 | PERFORMANCE INCREASE 15% |
| PACKET 4 | ACTION = NONE FOR LEVEL 1, NONE FOR LEVEL 2, NONE FOR LEVEL 3 | PERFORMANCE DECREASE 35% |
| PACKET 5 | ACTION = TEXTURING OF LEVEL 1, ANTI-ALIASING OF LEVEL 2, REMOVAL OF LEVEL 3 | PERFORMANCE INCREASE 40% |

IMPLEMENTING REDUCED VIDEO STREAM BANDWIDTH REQUIREMENTS WHEN REMOTELY RENDERING COMPLEX COMPUTER GRAPHICS SCENE

This application is a continuation application of Ser. No. 14/177,436 filed Feb. 11, 2014.

FIELD OF THE INVENTION

The present invention relates generally to the data processing field, and more particularly, relates to method and apparatus for implementing reduced video stream bandwidth requirements when remotely rendering a complex computer graphics scene.

DESCRIPTION OF THE RELATED ART

Cloud gaming is a growing business where much of the processing that was historically done on individual computers is now hosted instead in a cloud environment. In this environment, scene rendering is done by the cloud and then streamed to a host system where a user interacts with the video stream as though it were rendered locally.

The network bandwidth required for such an environment is significant, and any disruptions to the video stream can be catastrophic for the game appeal. Therefore, maintaining a consistent video stream is crucial for the success of any cloud-based game.

Typically when a network or cloud resource bottleneck is reached, the stream is compressed using standard video compression algorithms to reduce the amount of data required to stream. This results in a pixilated, degraded image, reducing the quality of the gaming experience.

A need exists for an efficient and effective method and apparatus for implementing reduced video stream bandwidth requirements when remotely rendering a complex computer graphics scene.

SUMMARY OF THE INVENTION

Principal aspects of the present invention are to provide a method and apparatus for implementing reduced video stream bandwidth requirements when remotely rendering a complex computer graphics scene. Other important aspects of the present invention are to provide such method and apparatus substantially without negative effects and that overcome many of the disadvantages of prior art arrangements.

In brief, a method and apparatus are provided for implementing reduced video stream bandwidth requirements when remotely rendering a complex computer graphics scene. Complexity of a scene is reduced at a server, prior to rendering a video stream that comprises the scene and transmitting the video stream to a client. Reducing the complexity of a scene at the server includes adjusting predefined scene configuration parameters. The order and degree to which predefined scene configuration parameters are adjusted is based upon a required stream bandwidth reduction to be made.

In accordance with features of the invention, the order and degree to which predefined scene configuration parameters adjustments are learned based upon history data, or are based upon preferences by each user.

In accordance with features of the invention, the predefined scene configuration parameters include removing background objects to reduce complexity. Other predefined scene configuration parameters include one or more of disabling water ripple and reflections; disabling clouds; reducing draw distance to limit number of scene objects; adjusting anti-aliasing and texture complexity.

In accordance with features of the invention, a controller determines the performance of the transmission of the video stream for the previous packet and stores the change in performance to history data.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 illustrates system operations with example history data in accordance with a preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing reduced video stream bandwidth requirements when remotely rendering a complex computer graphics scene.

Figure 1:
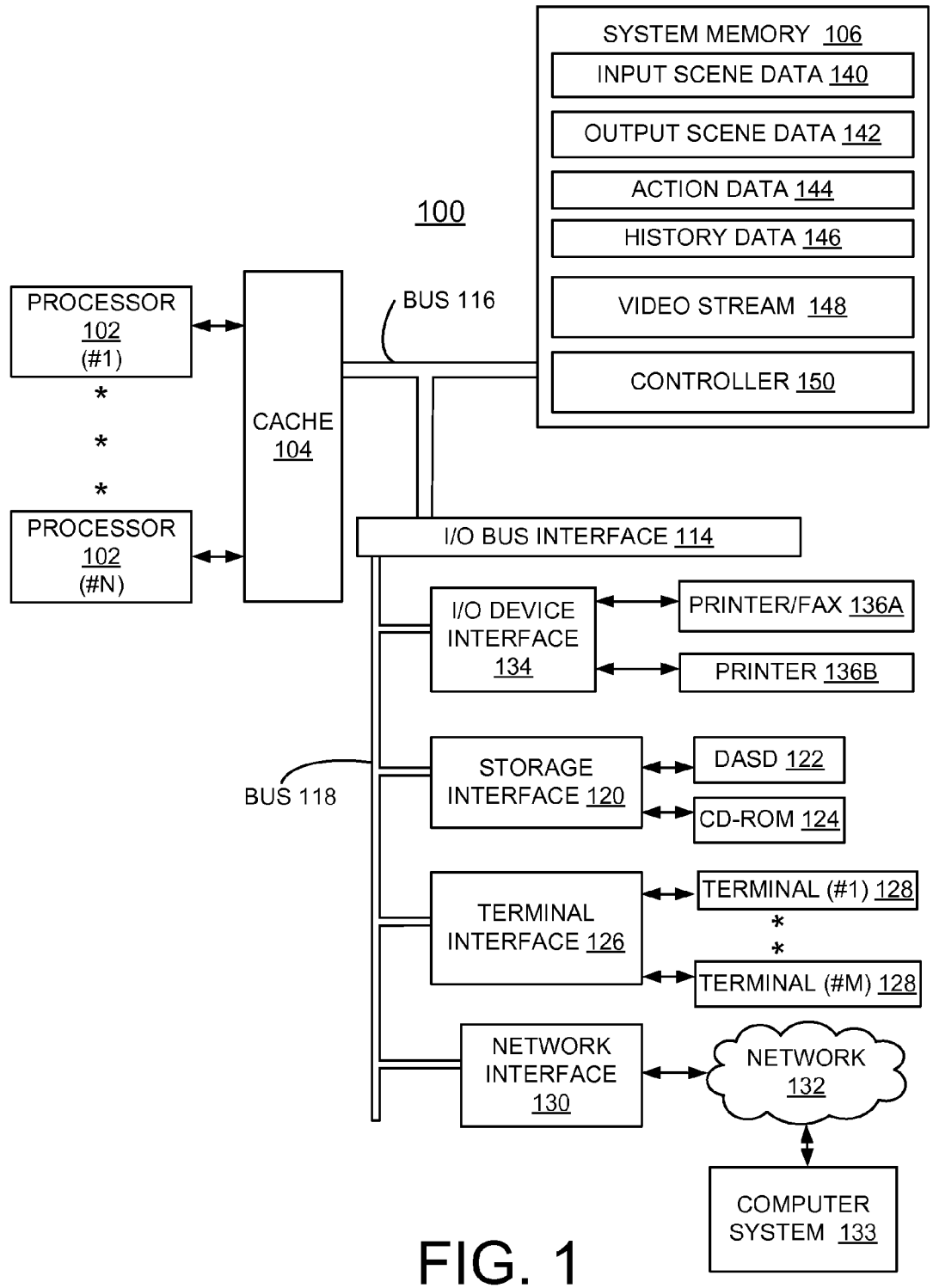
FIG. 1 is a block diagram of an example computer system for implementing reduced video stream bandwidth requirements when remotely rendering a complex computer graphics scene in accordance with a preferred embodiment.

Having reference now to the drawings, in FIG. 1, there is shown a computer system embodying the present invention generally designated by the reference character 100 for implementing reduced video stream bandwidth requirements when remotely rendering a complex computer graphics scene in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores input scene data 140, output scene data 142, action data 144, history data 146, video stream 148, and a controller 150 for implementing reduced video stream bandwidth requirements when remotely rendering a complex computer graphics scene in accordance with the preferred embodiments.

In accordance with features of the invention, by taking into account the game settings and scene makeup, a number of options advantageously are utilized to simplify the scene prior to rendering. For example, a densely populated forest scene might include hundreds of highly-detailed trees. Most compression algorithms are not generally successful in reducing the size of a scene like this significantly, due to the detail of each tree. However, if the trees are removed or replaced with much simpler trees, the rendered image would be far simpler without reducing the resolution, color depth, or failing to render in a necessary amount of time.

Figure 2:
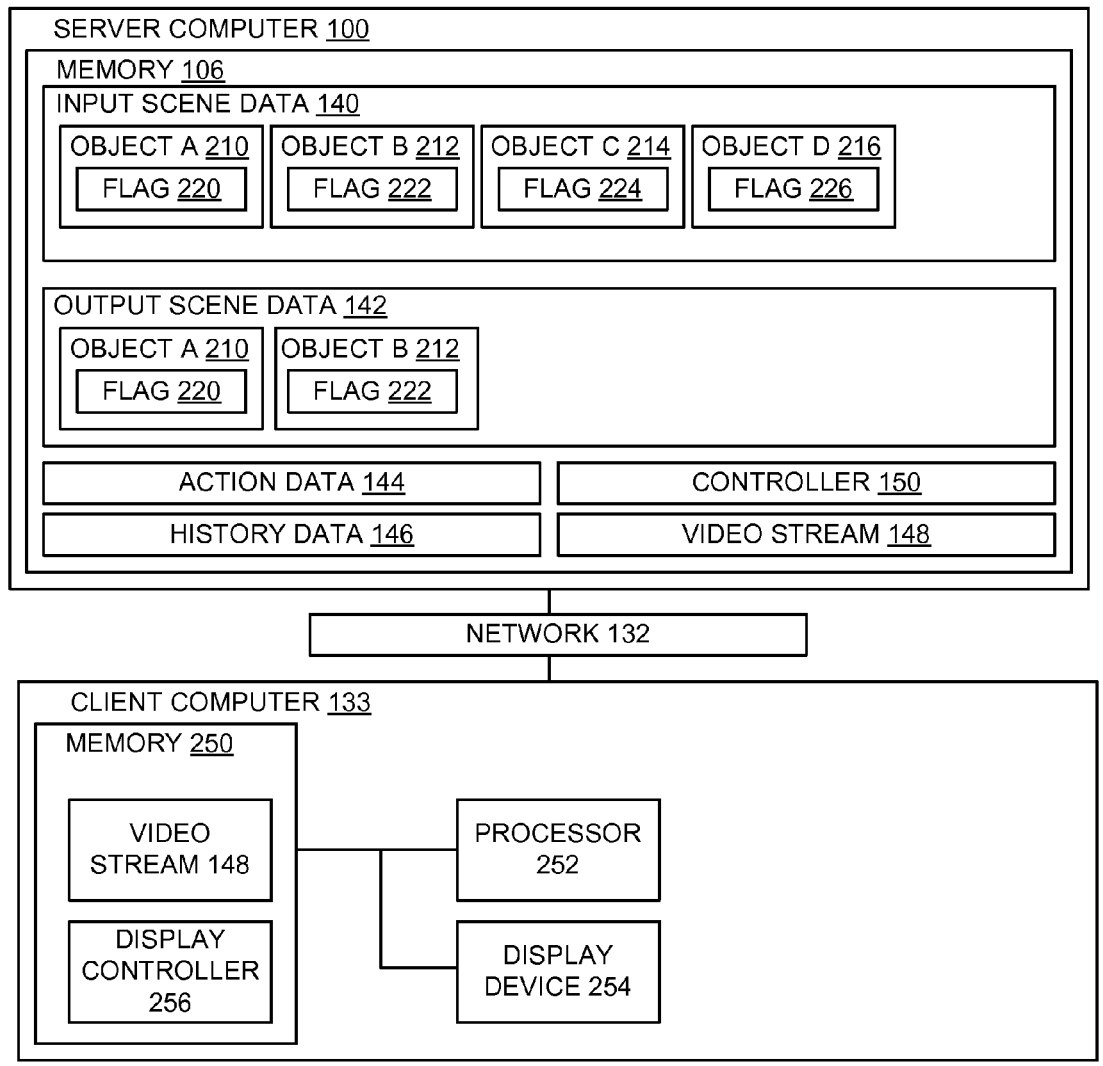
FIG. 2 is a block diagram of the system of FIG. 1 illustrating system operations with example input scene data and example output scene data in accordance with a preferred embodiment.

Referring to FIG. 2, there are shown system operations designated by the reference character 200 with more detailed example input scene data 140 and example output scene data 142 in the computer system 100 in accordance with a preferred embodiment. System operations 200 illustrate example input scene data 140 including a plurality of objects including object A, 210, object B, 212, object C, 214, and object D, 216. Each object A, 210, object B, 212, object C, 214, and object D, 216 includes a respective flag 220, 222, 224, and 226 produced by the controller 150, for example, using action data 144, and history data 146. System operations 200 show simplified example output scene data 142 including object A, 210, and object B, 212. The simplified example output scene data 142 are produced by the controller 150 using the flags 220, 222, 224, and 226. In the illustrated simplified example output scene data 142, object C, 214, and object D, 216 have been removed so that the video stream 148 being generated is a fundamentally simpler scene, requiring less bandwidth to be transmitted over network 132 in accordance with the preferred embodiments.

As shown in FIG. 2, the client computer 133 includes a memory 250, a processor 252, and a display device 254. The memory 250 of client computer 133 includes a display controller and receives and stores the video stream 148. The client computer 133 receives and displays the video stream 148, which required less bandwidth and was produced without relying on harsher compression or reduced color depth in accordance with the preferred embodiments.

In accordance with features of the invention, a fundamentally simpler scene requiring less bandwidth for the video stream 148 to be transmitted is generated, for example, by removing background objects from the input scene data 140 to reduce complexity. In addition other options optionally utilized to simplify the scene prior to rendering include various possible scene characteristics can be selectively reduced or removed to simplify the scene and reduce complexity, such as disabling water ripple and reflections, disabling clouds, reducing draw distance to limit number of scene objects, and adjusting anti-aliasing and texture complexity.

Figure 3:
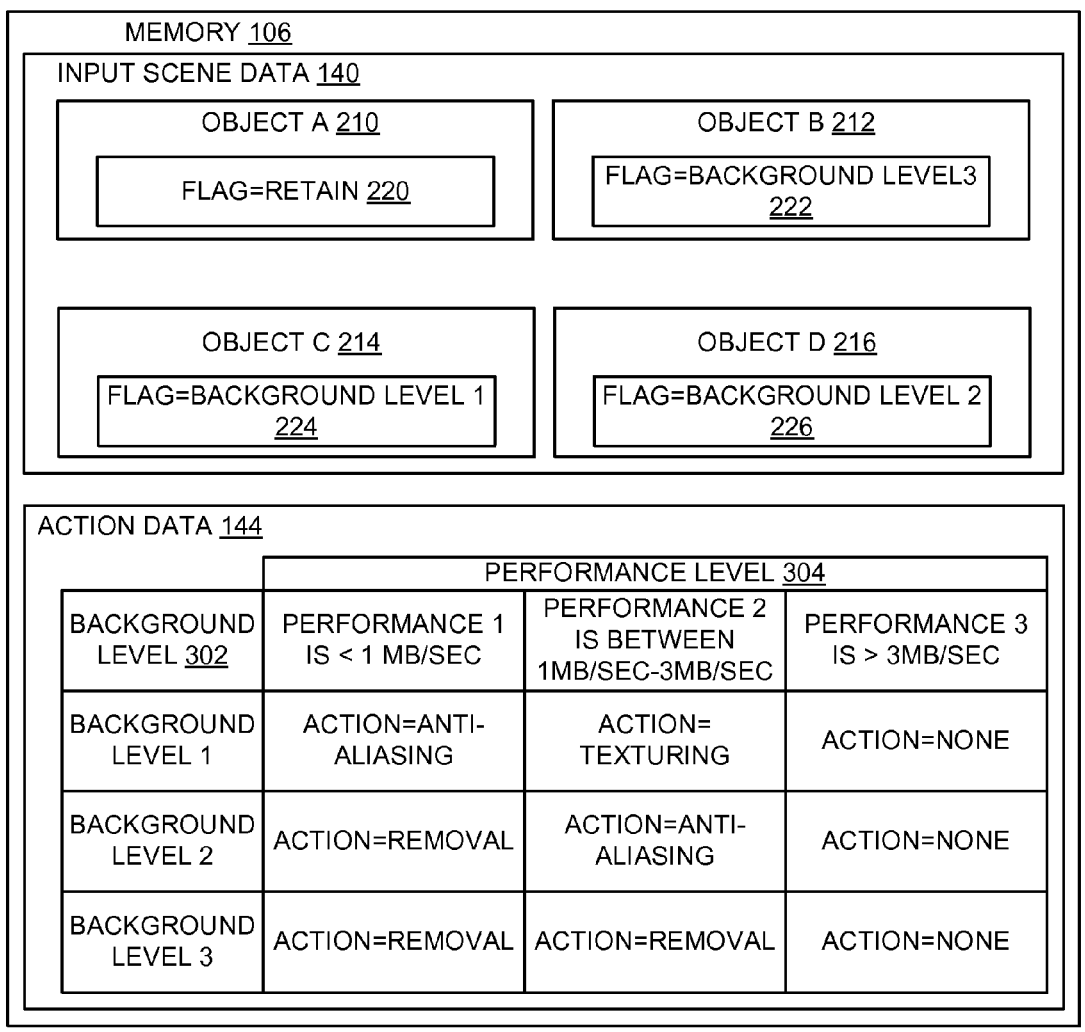
FIG. 3 is a block diagram of a memory of the system of FIG. 1 illustrating system operations with example input scene data and example action data in accordance with a preferred embodiment.

Referring to FIG. 3, there are shown system operations designated by the reference character 300 of the memory 106 with example input scene data 140 and example action data 144. The example input scene data 140 including the plurality of objects including object A, 210, object B, 212, object C, 214, and object D, 216 with the respective flag 220, 222, 224, and 226 is shown with example action data 144 in accordance with a preferred embodiment. System operations 300 illustrate example action data 144 including a respective background level 302 together with a respective performance level 304 including performance 1 less than 1 Mb/Sec; performance 2 is between 1 Mb/Sec and 3 Mb/Sec, and performance 3 is greater than 3 Mb/Sec. For example, as shown with a background level 1 and at performance 1, the action equals anti-aliasing; at performance 2, the action equals texturing; and at performance 3, the action equals none. For example, as shown with a background level 2 and at performance 1, the action equals removal; at performance 2, the action equals anti-aliasing; and at performance 3, the action equals none. For example, as shown with a background level 3 and at performance 1, the action equals removal; at performance 2, the action equals removal; and at performance 3, the action equals none.

Referring also to FIG. 4, there are shown system operations designated by the reference character 400 of the example history data 146 in accordance with a preferred embodiment. The example history data 146 includes a packet ID 402, an action 404, and a result 406. For example, as shown with the packet ID 402 of a first packet 1, and a second packet 2, the action equal none for performance levels 1, 2, and 3 with the result 406 of a performance decrease 5% for packet 1 and of a performance decrease 25% for packet 2. For example, as shown with the packet ID 402 of a first packet 3, and the action 404 equals anti-aliasing for performance level 1, and equals removal for performance levels 2, and 3 with the result 406 of a performance increase 15%. For example, as shown with the packet ID 402 of a first packet 4, and the action equal none for performance levels 1, 2, and 3 with the result 406 of a performance decrease 35%. For example, as shown with the packet ID 402 of a first packet 5, and the action 404 equal texturing for performance level 1, and equals anti-aliasing for performance level 2, and equals removal for performance level 3 with the result 406 of a performance increase 40%.

Figure 5:
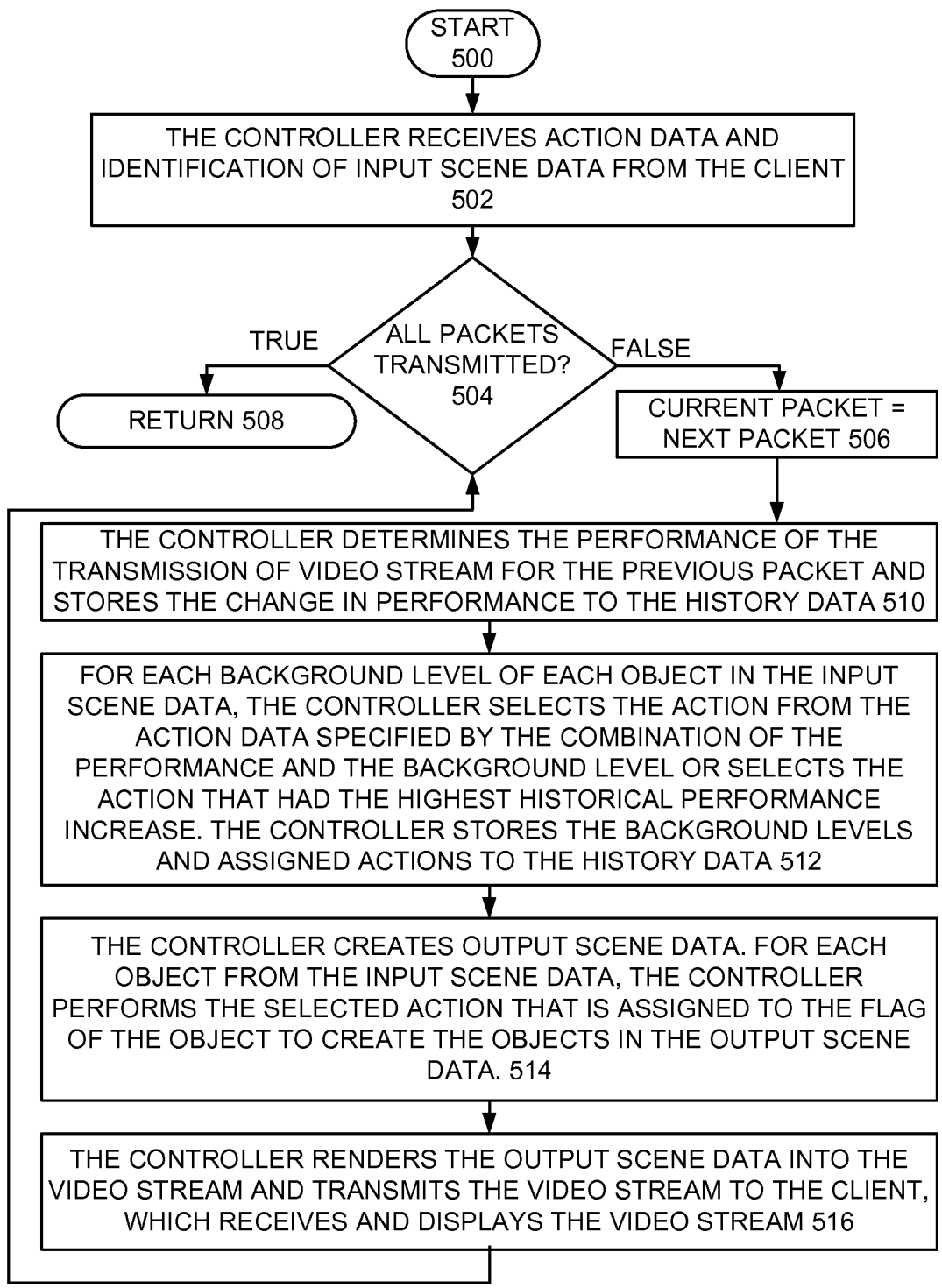
FIG. 5 is a flow chart illustrating example operations for implementing reduced video stream bandwidth requirements when remotely rendering a complex computer graphics scene in accordance with the preferred embodiment.

Referring also to FIG. 5, there are shown example operations for implementing reduced video stream bandwidth requirements when remotely rendering a complex computer graphics scene in accordance with the preferred embodiment starting at a block 500. As indicated in a block 502, the controller 150 receives action data 144 and identification of input scene data 140 from the client, for example to configure preferences by each user. As indicated in a decision block 504, for all packets to be transmitted, a current packet is set to the next packet as indicated in a block 506, until the operation return with all packets transmitted as indicated in a block 508. For processing each packet, the controller 150 determines the performance of the previous packet and stores the change in performance to the history data 146 as indicated in a block 510. As indicated in a block 512, for each background level 302 of each object in the input scene data 140, the controller selects the action 404 from the action data specified by the combination of performance and the background level or selects the actions that had the highest historical performance increase; and the controller stores the background levels and assigned actions 404 to the history data 146. As indicated in a block 514, the controller 150 creates output scene data 142, for each object from the input scene data 140; the controller 150 performs the selected action that is assigned to the flag of the object to create the objects in the output scene data 142. As indicated in a block 516, the controller renders the output scene data into the video stream 148 and transmits the video stream to the client 133, which receives and displays the video stream.

Figure 6:
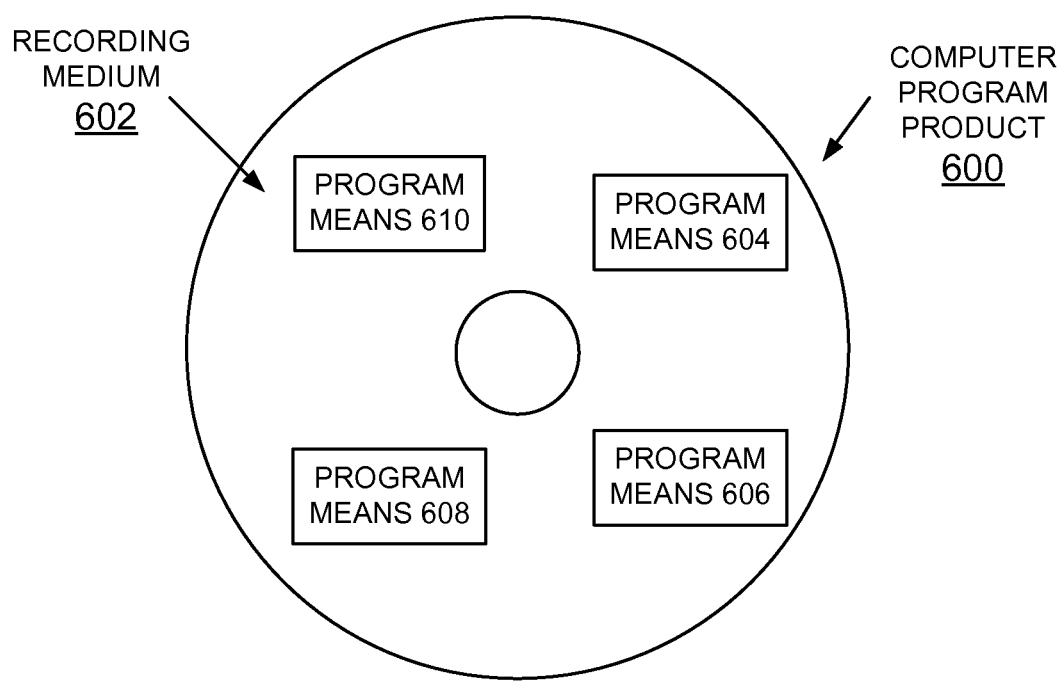
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing reduced video stream bandwidth requirements when remotely rendering a complex computer graphics scene of the preferred embodiment in the system 100 of FIG. 1.

A sequence of program instructions or a logical assembly of one or more interrelated modules defined by the recorded program means 604, 606, 608, and 610, direct the system 100 for implementing reduced video stream bandwidth requirements when remotely rendering a complex computer graphics scene of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing reduced video stream bandwidth requirements when remotely rendering a complex computer graphics scene comprising the steps of:

receiving action data and identification of input scene data from a client to configure preferences by each user and reducing complexity of a scene at a server, prior to rendering a video stream that comprises the scene and transmitting the video stream to a client by:

processing each data packet to be transmitted by identifying and storing history data including a packet ID, an action, and a result of a performance change; for each data packet ID, said action including a stored action for a plurality of performance levels with said result of a performance change;

for each data packet ID, determining performance of transmission of the video stream for a previous packet and storing a identified performance change in the history data;

adjusting predefined scene configuration parameters responsive to the history data including providing an order and a degree for predefined scene configuration parameters adjustments based upon a required stream bandwidth reduction to be made by providing action data including a respective background level and a respective action to achieve a selected one of a plurality of performance levels;

storing a flag for each respective input scene data object responsive to a combination of said received action data, said identification of input scene data, and said adjusted predefined scene configuration parameters;

creating output scene data for each object from the input scene data by performing a selected action assigned to the flag for each respective input scene data object to create objects in the output scene data, and rendering the output scene data into the video stream and transmitting the video stream to the client.

2. The method as recited in claim 1 wherein reducing complexity of a scene at a server for each data packet ID, includes removing background objects in the scene to reduce complexity.

3. The method as recited in claim 1 wherein reducing complexity of a scene at a server includes disabling water ripple and reflections in the scene to reduce complexity.

4. The method as recited in claim 1 wherein reducing complexity of a scene at a server includes disabling clouds in the scene to reduce complexity.

5. The method as recited in claim 1 wherein reducing complexity of a scene at a server includes adjusting anti-aliasing and texture complexity in the scene to reduce complexity.

6. The method as recited in claim 1 wherein reducing complexity of a scene at a server includes learning the order and degree for predefined scene configuration parameters adjustments based upon history data.

7. The method as recited in claim 1 wherein reducing complexity of a scene at a server includes providing the order and degree for predefined scene configuration parameters adjustments based upon preferences by each user.

8. The method as recited in claim 1 wherein reducing complexity of a scene at a server includes determining a performance level of the transmission of the video stream for a previous packet and storing a change in performance to history data; and includes selecting an action from a combination of performance level and background level.

9. The method as recited in claim 1 wherein reducing complexity of a scene at a server includes selecting an action having a highest historical performance increase.

* * * * *